(12) United States Patent
Lee

(10) Patent No.: US 12,457,545 B2
(45) Date of Patent: Oct. 28, 2025

(54) METHOD AND APPARATUS FOR UPDATING DATA TRANSFER DISTURBANCE IN MULTI-AGENT MULTI-DEVICE ML OPERATIONS

(71) Applicant: LG Electronics Inc., Seoul (KR)

(72) Inventor: Ki-Dong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 17/919,356

(22) PCT Filed: May 6, 2021

(86) PCT No.: PCT/KR2021/005650
§ 371 (c)(1),
(2) Date: Oct. 17, 2022

(87) PCT Pub. No.: WO2021/225377
PCT Pub. Date: Nov. 11, 2021

(65) Prior Publication Data
US 2023/0156568 A1     May 18, 2023

Related U.S. Application Data

(60) Provisional application No. 63/063,974, filed on Aug. 11, 2020, provisional application No. 63/021,690, filed on May 8, 2020.

(51) Int. Cl.
*H04W 48/04*   (2009.01)
*H04L 41/046*  (2022.01)
*H04L 67/1008* (2022.01)
*H04W 48/16*   (2009.01)

(52) U.S. Cl.
CPC ........... *H04W 48/04* (2013.01); *H04L 41/046* (2013.01); *H04L 67/1008* (2013.01); *H04W 48/16* (2013.01)

(58) Field of Classification Search
CPC . H04L 67/1023; H04L 67/52; H04L 67/1008; H04L 41/046; H04W 4/02; H04W 48/04; H04W 48/16; G06N 3/006; G06N 20/00
See application file for complete search history.

(56) References Cited

U.S. PATENT DOCUMENTS

| | | | |
|---|---|---|---|
| 7,966,025 B1 | 6/2011 | O'Neil | |
| 2008/0281952 A1* | 11/2008 | Fedotenko | H04L 67/30 715/864 |
| 2010/0248742 A1* | 9/2010 | Song | H04L 12/185 455/456.1 |
| 2011/0176424 A1* | 7/2011 | Yang | H04L 41/0853 370/235 |

(Continued)

*Primary Examiner* — Syed Ali
(74) *Attorney, Agent, or Firm* — Fish & Richardson P.C.

(57) ABSTRACT

A method and apparatus for updating data transfer disturbance in multi-agent multi-device ML operations is described. A wireless device receives, from the first server, restriction information generated based on (i) the location information based on the wireless device, (ii) the residing area information of the wireless device, and/or (iii) the serving network related information. A wireless device checks whether a second server, other than the first server, is available. A wireless device transmits, to the second server, the restriction information generated by the first server.

11 Claims, 18 Drawing Sheets

(56) References Cited

U.S. PATENT DOCUMENTS

| | | | |
|---|---|---|---|
| 2013/0281090 A1* | 10/2013 | Maeda | H04W 48/16 |
| | | | 455/434 |
| 2019/0081935 A1* | 3/2019 | Broussard | H04L 67/52 |
| 2019/0156016 A1 | 5/2019 | Fram | |
| 2019/0182215 A1 | 6/2019 | Dong et al. | |
| 2019/0313369 A1* | 10/2019 | Abedini | H04W 68/00 |
| 2020/0110173 A1 | 4/2020 | Cao et al. | |

* cited by examiner

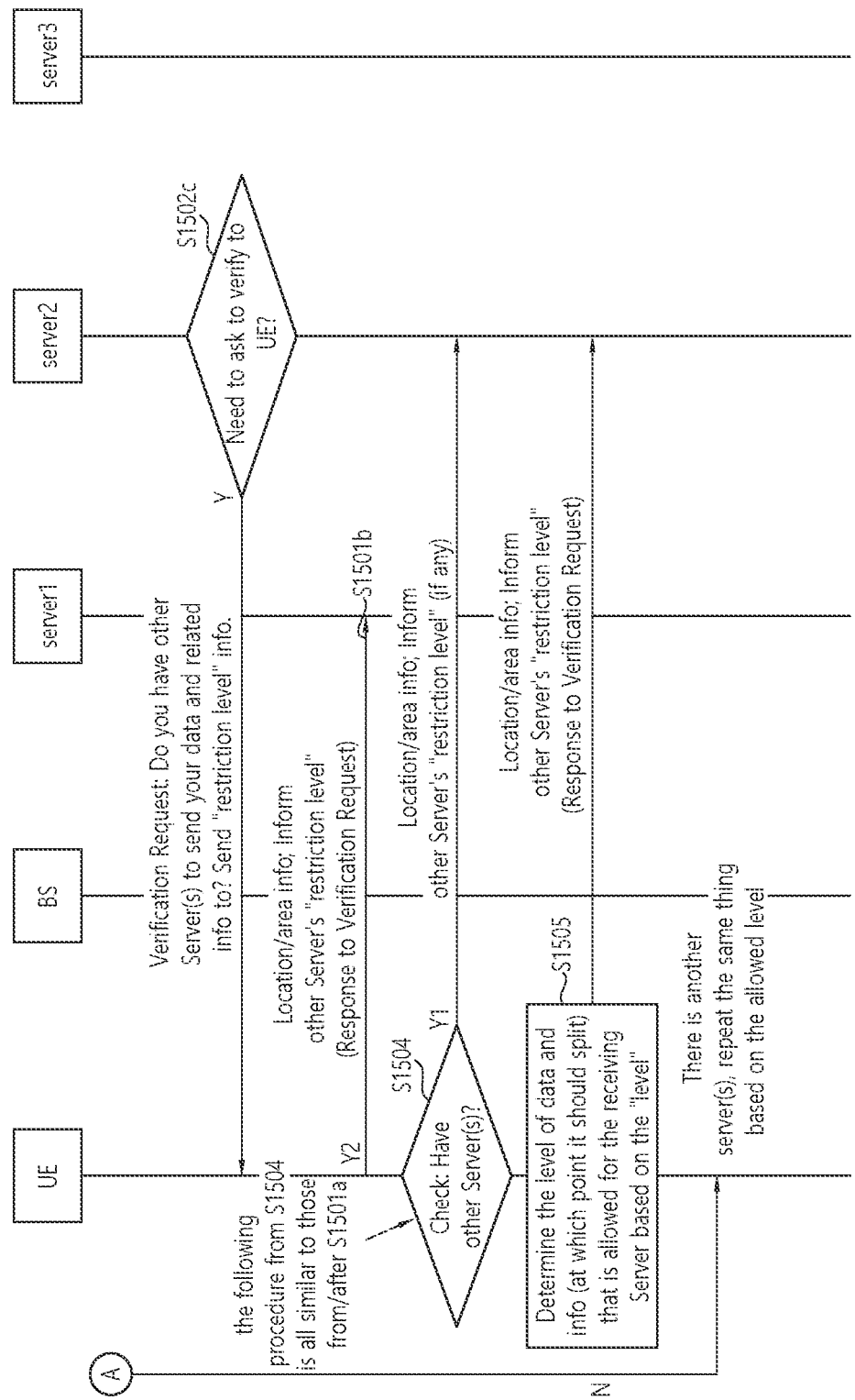

METHOD AND APPARATUS FOR UPDATING DATA TRANSFER DISTURBANCE IN MULTI-AGENT MULTI-DEVICE ML OPERATIONS

CROSS-REFERENCE TO RELATED APPLICATIONS

This application is a National Stage application under 35 U.S.C. § 371 of International Application No. PCT/KR2021/005650, filed on May 6, 2021, which claims the benefit of U.S. Provisional Application No. 63/021,690, filed on May 8, 2020 and U.S. Provisional Application No. 63/063,974, filed on Aug. 11, 2020. The disclosures of the prior applications are hereby incorporated by reference herein in their entirety.

BACKGROUND

Technical Field

The present disclosure relates to a method and apparatus for updating data transfer disturbance in multi-agent multi-device ML operations.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

Machine Learning (ML) operations may include the collection of data (or meta data). The ML operations may include a mandatory process (for example, classification and/or labelling) based on the collected data. The ML operations may The ML operations may include transferring the processed data in the form of a model to a decision makers (for example, robot, intelligent wireless device, or terminal module (for example, camera with AI feature for object detection, object-centric focusing, etc.)). The decision makers may utilize the processed data.

Data collection takes place in a wide range, for example, regionally, geographically, and/or culturally.

However, in reality, legal and technical restrictions can occur in data collection. This restriction may cause disturbance in the transmitting a large amount of data. In particular, In particular, (1) the mobility of the terminal/robot itself and (2) the mobility of the terminal due to the movement of a large number of people may cause disturbance in the transmitting a large amount of data.

Therefore, studies for updating data transfer disturbance in multi-agent multi-device ML operations are needed.

Technical Solutions

In an aspect, a method performed by a wireless device in a wireless communication system is provided. A wireless device transmits, to a first server, (i) a location information of the wireless device, (ii) a residing area information of the wireless device, and/or (iii) a serving network related information. A wireless device receives, from the first server, restriction information generated based on (i) the location information based on the wireless device, (ii) the residing area information of the wireless device, and/or (iii) the serving network related information. A wireless device checks whether a second server, other than the first server, is available. Based on that the second server is available, a wireless device transmits, to the second server, (1) (i) a location information of the wireless device, (ii) a residing area information of the wireless device, and/or (iii) a serving network related information, and (2) the restriction information generated by the first server.

In another aspect, an apparatus for implementing the above method is provided.

Technical Effects

The present disclosure may have various advantageous effects.

According to some embodiments of the present disclosure, a wireless device could perform mass data transmission efficiently.

For example, a wireless device could perform the mass data transmission by minimizing disturbance caused by technical factors or (zone-based) regulatory factors.

For example, a wireless device could perform the mass data transmission by bypassing and/or preparing disturbance caused by technical factors or (zone-based) regulatory factors.

According to some embodiments of the present disclosure, a wireless communication system could provide an efficient solution for mass data collection.

For example, a wireless communication system could perform the mass data collection by preparing, bypassing, and minimizing disturbance by technical factors or (zone-based) regulatory factors.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 15A and 15B show an example of a method for updating data transfer disturbance in multi-agent multi-device ML operations.

DETAILED DESCRIPTION

Figure 1:
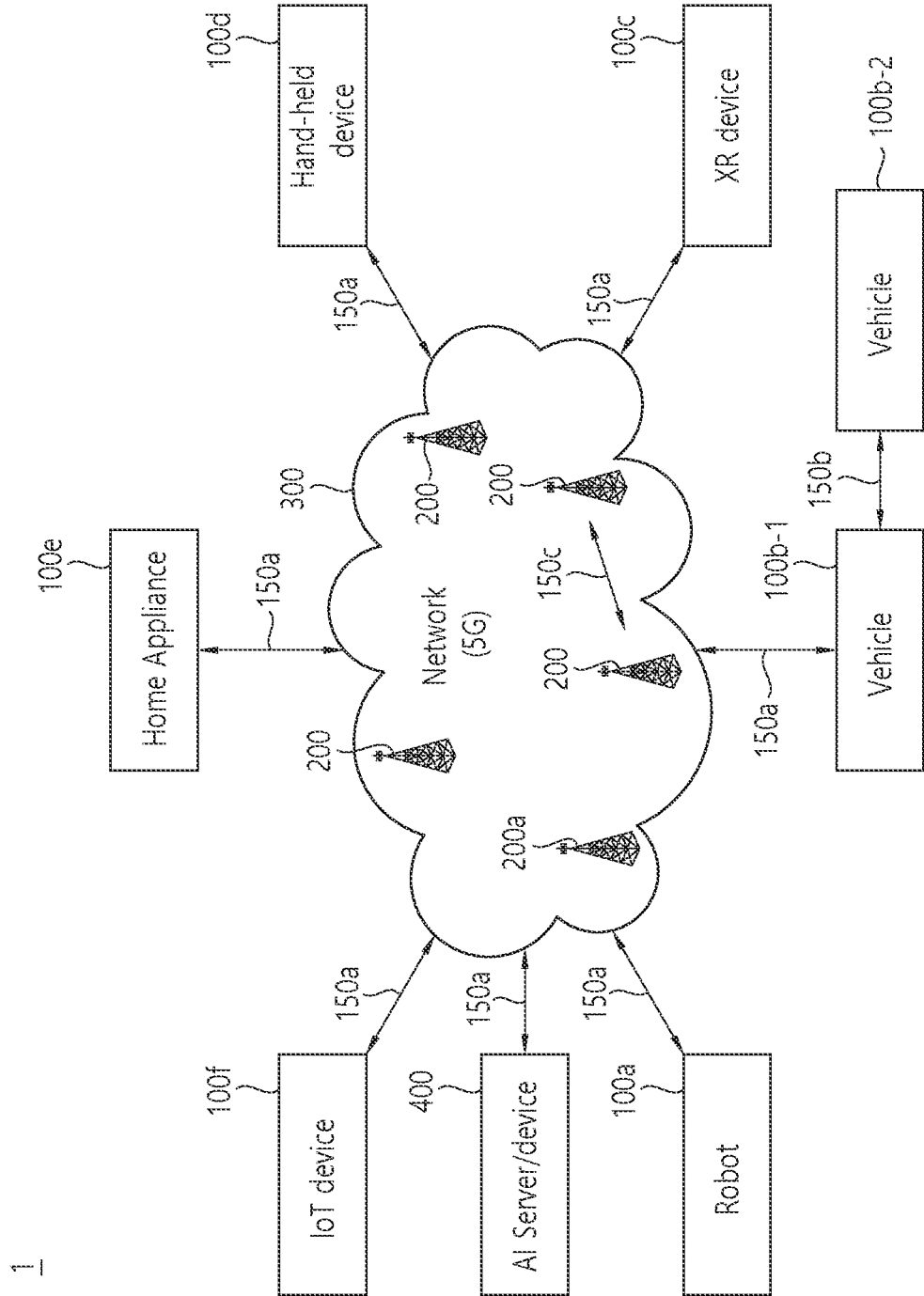
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB). (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee®, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
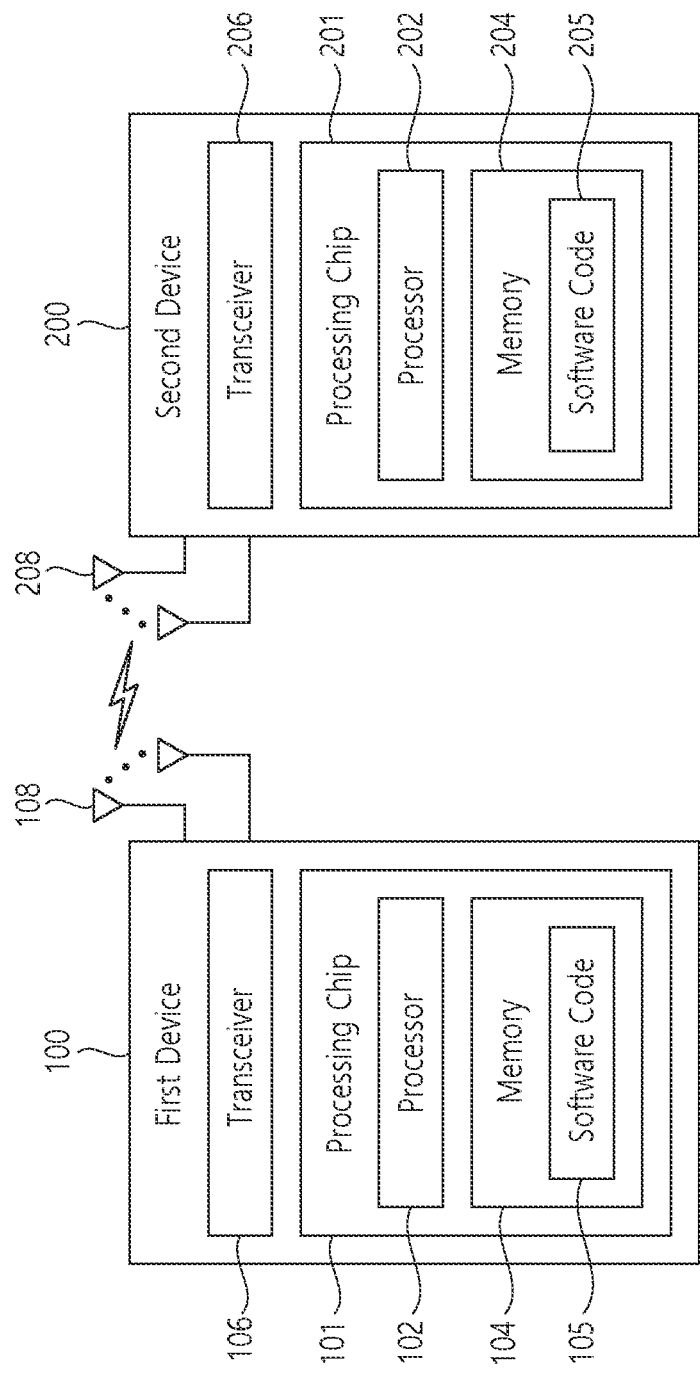
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as anode B (NB), an eNode B (eNB), or a gNB.

Figure 3:
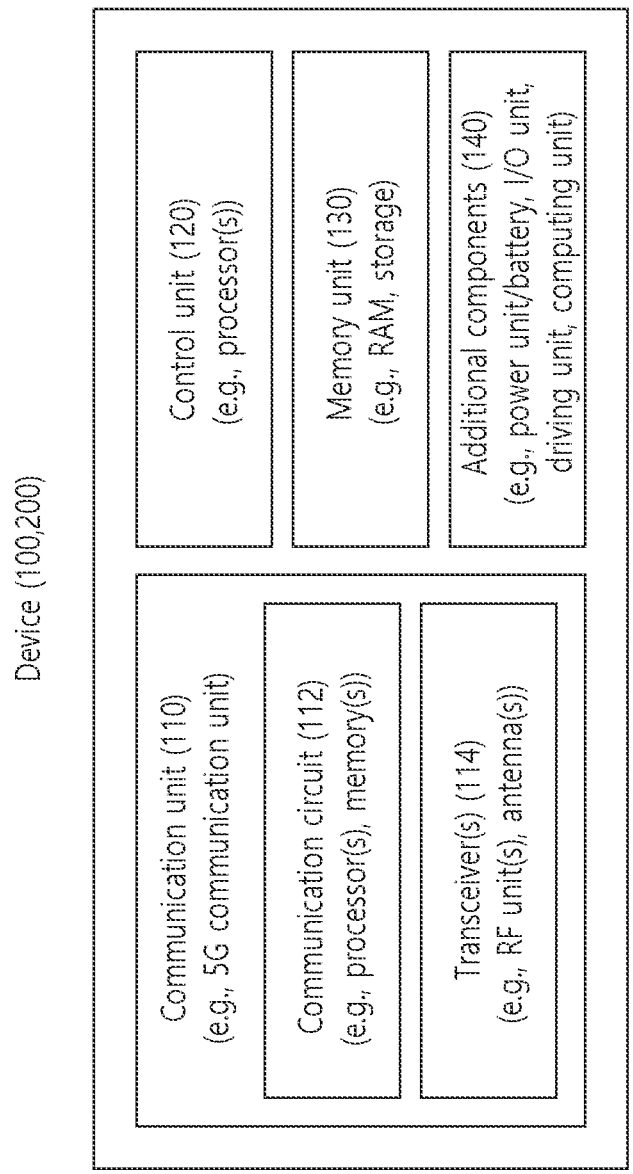
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/ mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
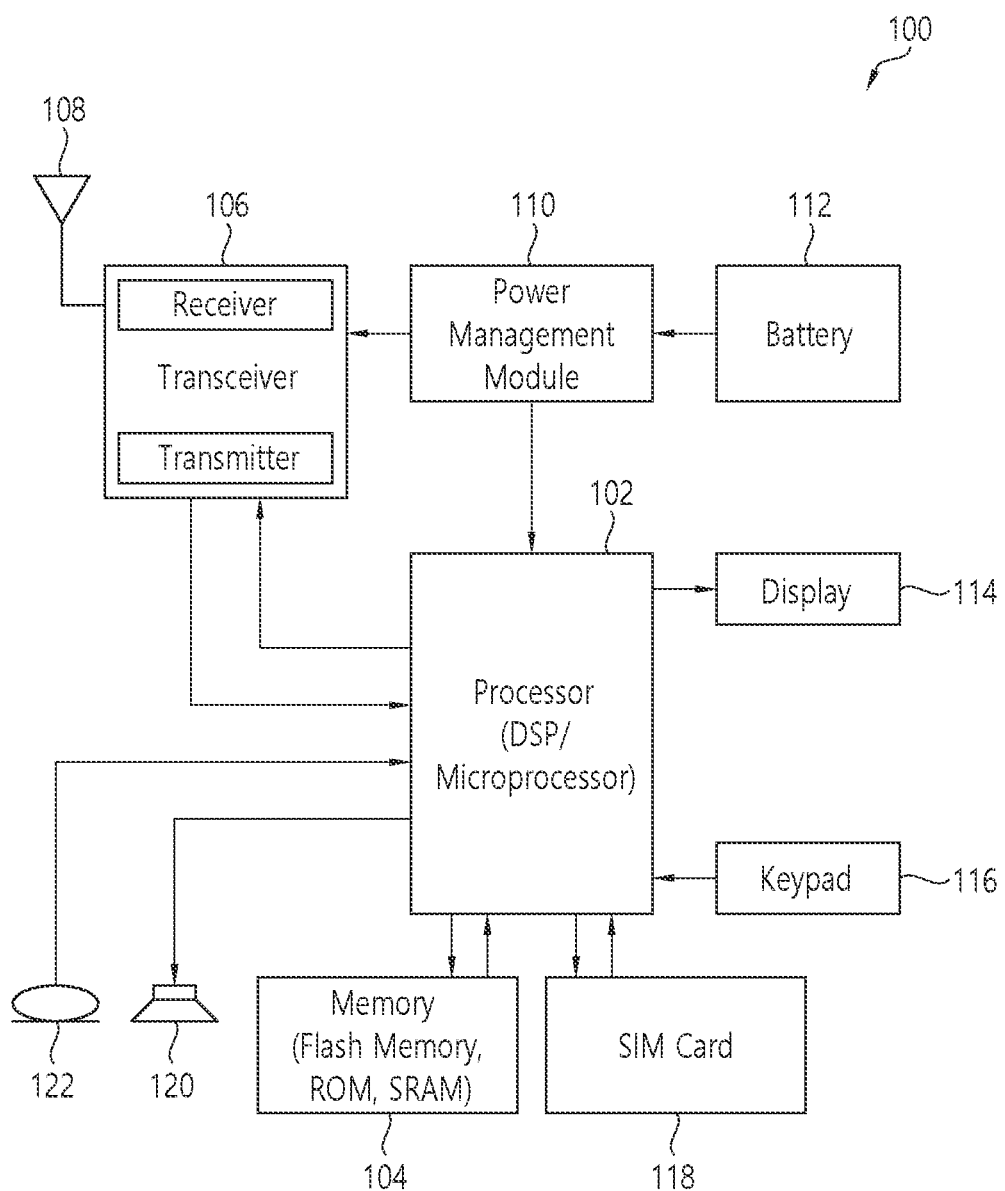
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
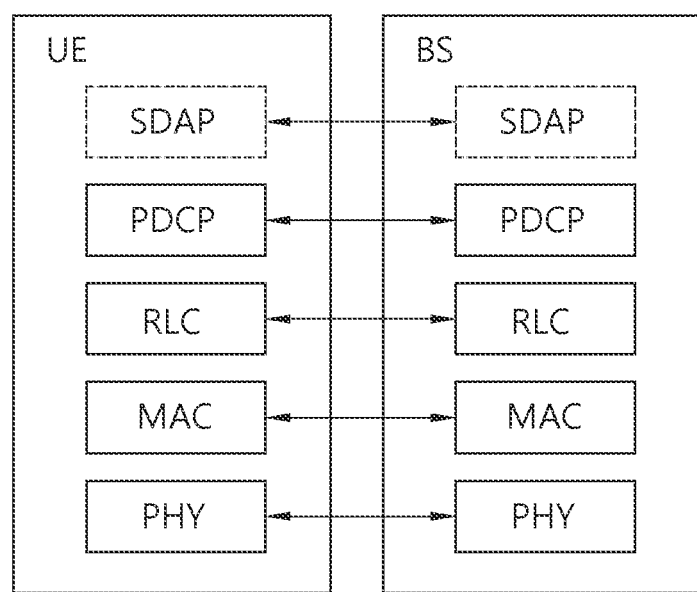
FIGS. 5 and 6 show an example of protocol stacks in a 3GPP based wireless communication system to which implementations of the present disclosure is applied.
Figure 6:
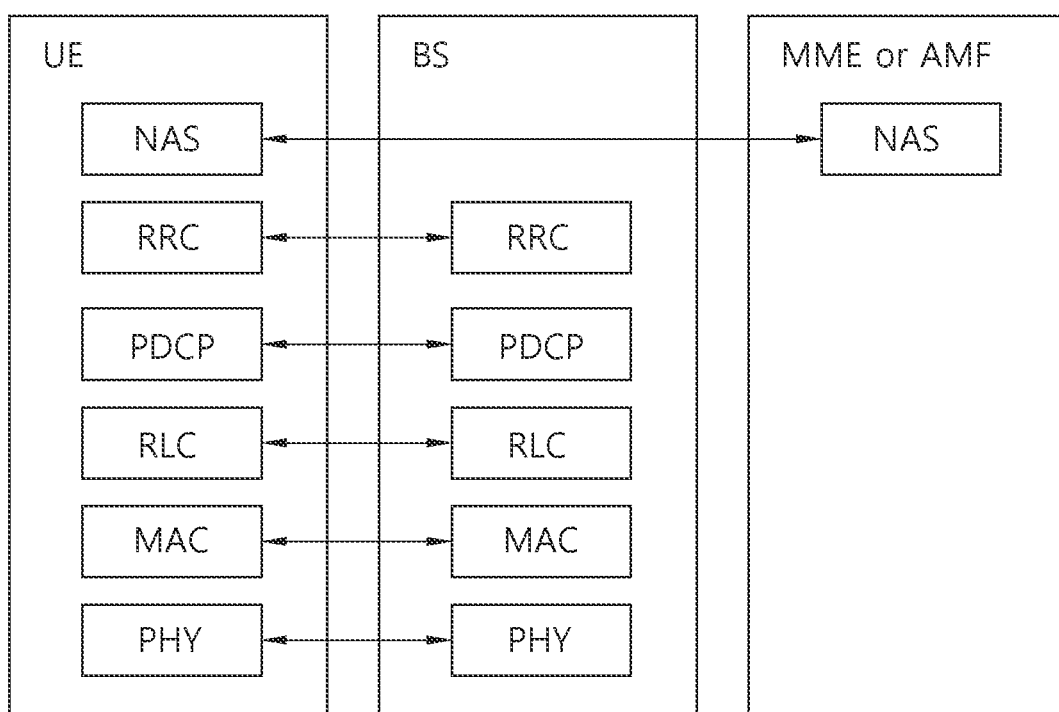

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Meanwhile, Machine Learning (ML) operations may include the collection of data (or meta data). The ML operations may include a mandatory process (for example, classification and/or labelling) based on the collected data. The ML operations may The ML operations may include transferring the processed data in the form of a model to a decision makers (for example, robot, intelligent wireless device, or terminal module (for example, camera with AI feature for object detection, object-centric focusing, etc.)). The decision makers may utilize the processed data.

Data collection takes place in a wide range, for example, regionally, geographically, and/or culturally.

However, in reality, legal and technical restrictions can occur in data collection. This restriction may cause disturbance in the transmitting a large amount of data. In particular, In particular, (1) the mobility of the terminal/robot itself and (2) the mobility of the terminal due to the movement of a large number of people may cause disturbance in the transmitting a large amount of data.

Therefore, studies for updating data transfer disturbance in multi-agent multi-device ML operations are needed.

A Machine Learning (ML) may be a computer (that has no or limited imprinted programs for a certain task) exploiting its own capability (performance) towards a certain task using data (experience). There are several criteria to classify the types of Machine Learning depending on the characteristics of the method used. This use case is intended to describe a case of ML operation with heavy data (for example, the data size is huge) when there is data collection/delivery disturbance (for example, privacy regulation or temporary technical limitation like shortage of network resources or temporary failure). This use case is specifically related to the use of "multiple batch learning" (MBL) which typically utilizes a group of agents (servers) as opposed to using a single agent in plain "batch learning". MBL is known to be better performing when the data is too big for a single agent/server to handle.

Figure 7:
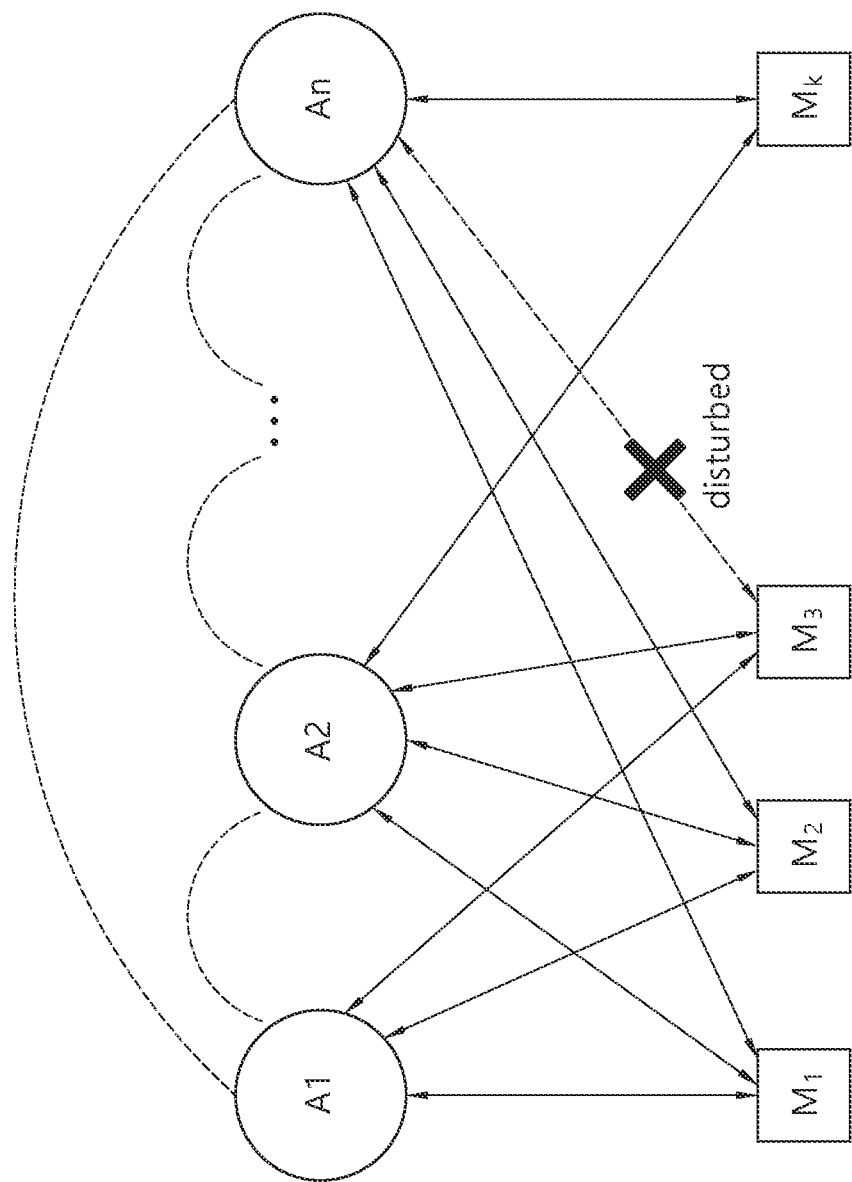
FIG. 7 shows an example of multiple batch learning to which implementations of the present disclosure is applied.

FIG. 7 shows an example of multiple batch learning to which implementations of the present disclosure is applied.

In FIG. 7, there may be bipartite relation between computers (for example, (M1, M2, . . . , Mk in the form of UE) and multiple agents (for example, A1, A2 . . . , An). For example, the UE may be a form of Service-Oriented Robot or Service Robot.

Data sharing between any pair of agents, if exists, may be or be not disturbed/restricted. In "sharing scenario", the data would generally be deep-processed data as opposed to simply pre-processed or raw data.

Computer M3 (or UE M3) may be used to have a connection to agent A1, A2 and An. However, at a certain point of time, the connection to agent An may be disturbed and become unavailable.

Figure 8:
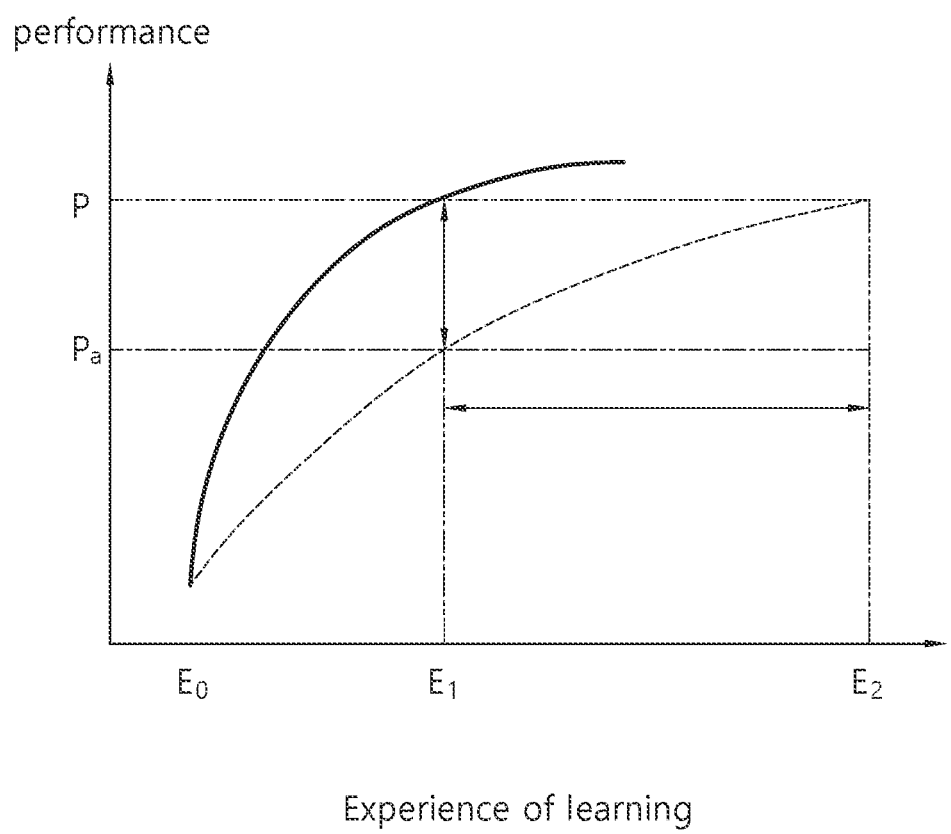
FIG. 8 shows performance related to experience of learning to which implementations of the present disclosure is applied.

FIG. 8 shows performance related to experience of learning to which implementations of the present disclosure is applied.

For example, FIG. 8 shows performance gap versus experience of learning for a given task: (1) with disturbance of input data collection/delivery (solid line) (2) without disturbance of input data collection/delivery (dashed line).

When privacy was not affecting the flow of data from the source to the learning agent (for example, a server), the performance is the outcome of all possible computational considerations of the data collected (for example, refer to the solid curve in FIG. 8).

However, if there is a certain level of disturbance in data collection, the achievable performance toward the given task would not be as good as the one with no such disturbances (refer to the gap between the solid curve and the dashed curve in the FIG. 8).

Examples of such disturbances may include:
(1) privacy regulations, such as General Data Protection Regulation (GDPR) of European Union (EU) or California Consumer Privacy Act (CCPA) of United State of America (USA);
(2) limited capability of transport-layers, such as lack of network resources (for example, radio resources due to temporal degradation, higher noise/interference level, highly crowed situations, break-down, and so on) preventing input data from being delivered in time:
a) case 1: a portion of input data delivered in time is still useful (for example, entropy can get increased/improved)
b) case 2: a portion of input data delivered in time is not useful (for example, it's not enough to get entropy increased/improved)

It is commonly understood that the more data a learning model utilizes the better performance the learning model can achieve (assuming the data are reasonably independent), if not too large.

However, if there is some disturbance in data collection/delivery, such as regional regulations or technical limitations (as described above), the expected performance would not be as good as the case without the disturbance (the vertical difference in FIG. 8). In addition, it is expected that the learning model would need to take more time to accumulate "experience" with the reduced feeding-rate of learning data caused by such disturbance (the horizontal difference in FIG. 8).

Figure 9:
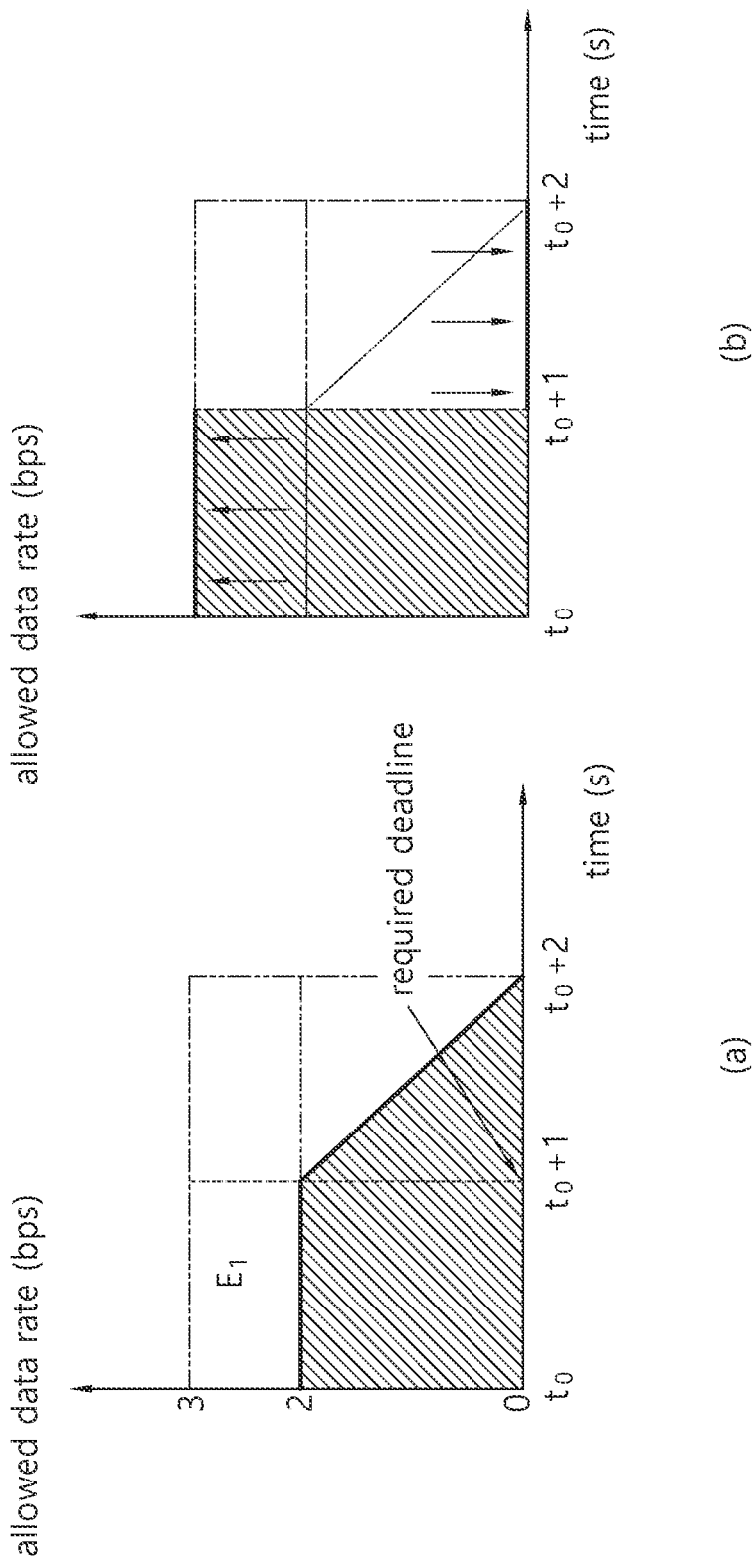
FIG. 9 shows an example of disturbance of input data delivery according to LM operations to which implementations of the present disclosure is applied.

FIG. 9 shows an example of disturbance of input data delivery according to LM operations to which implementations of the present disclosure is applied.

In particular, FIG. 9 shows disturbance of input data delivery within a required deadline of 1 sec ($t=t_0+1$) with the amount of useful "input data" 3 bits (as an example): (a) For the 3-bit input data amount ("trapezoid"), it takes 2 sec with "imperfect scheduling" (b) For the 3-bit input data amount ("rectangle"), it takes 1 sec with "good scheduling" where the network resources can be assigned to others (other UEs) during ($t_0+1$, $t_0+2$).

In other words, FIG. 8 shows an example of disturbance of input data delivery within a required deadline of 1 sec ($t=t_0+1$) with the amount of useful "input data" 3 bits in which two different kinds of scheduling are given: (a) is imperfect scheduling whereas (b) is good scheduling as an example, respectively.

In reality, the delivery payload type is not limited to "input data" for learning agent(s) and it can also be applied to "learning model" transfer. The delivery direction can be "uplink" (for example, for input data transfer/delivery) or "downlink" (for example, for model distribution/transfer). This simplified example may be intended to explain the justification why new technical requirements would be needed especially when some disturbance exists (for example, by regulatory or technical causes).

Given the regulatory disturbance, it is intended to improve such delivery disturbances caused by technology (for example, scheduling and/or information necessary for 3GPP entity to perform "good scheduling"). The expected requirements and service flow description are as follows.

Hereinafter, for the convenience of explanation, following pre-condition, settings, and/or assumptions are introduced. However, the present disclosure is not limited thereto.

There may be three UEs, M1, M2 and M3 (computers or learning machines in the form of a UE).

There may be two agents/servers that are involved with MBL located in the cloud.

Agent A1 working with agent A2 for a task may be able to talk to each other to share the outcome so that the outcome from distributed computing can get together.

A UE may be connected to one agent via eNB (or ng-eNB, gNB) when data connection is necessary (for example, when needed to upload some data or when needed to download some model).

Hereinafter, an example of Operation Service Flows is described.

Figure 10:
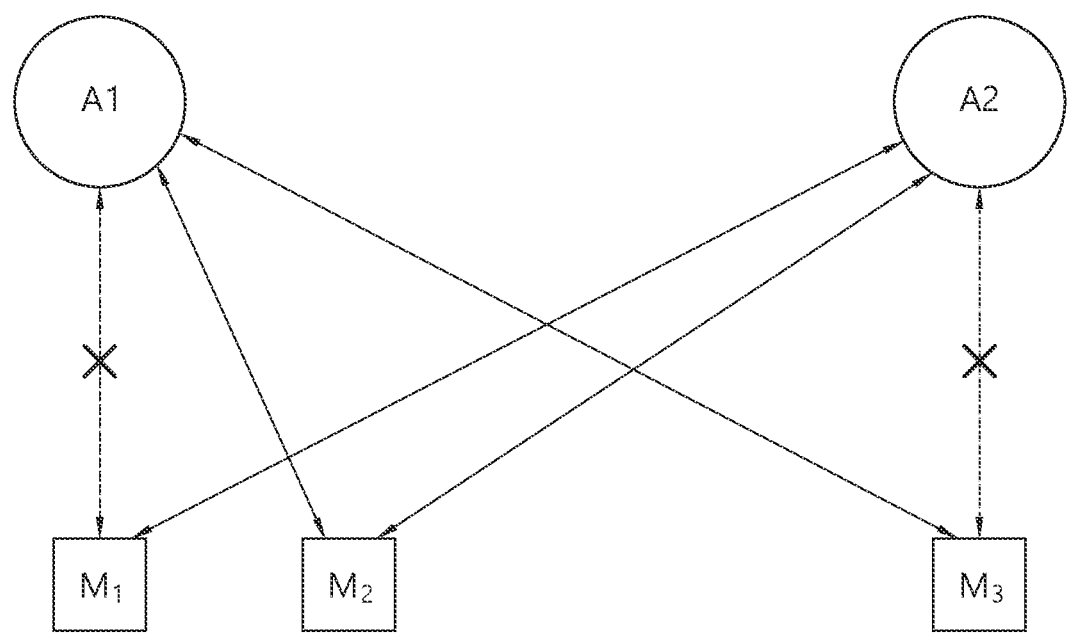
FIG. 10 shows an example of data sharing between computers (M1, M2, M3 in the form of UE) and agents (A1, A2) with disturbance in communication (for example, in at least one communication link/path) to which implementations of the present disclosure is applied.

FIG. 10 shows an example of data sharing between computers (M1, M2, M3 in the form of UE) and agents (A1, A2) with disturbance in communication (for example, in at least one communication link/path) to which implementations of the present disclosure is applied.

The service flows of MBL operations can be different from each other, depending on the regional regulations (for example, Privacy Acts/Laws) or service availability (for example. Radio Coverage of NR/E-UTRA typically from the Infrastructure Node, such as gNB or eNB).

In FIG. 10, UE M1 (Robot) may have limited or no access availability (restricted by not being covered by the NR/E-UTRA or by regional/local regulations) to Agent A1 but has no limitation to Agent A2. UE M2 (Robot) may have no limitations in both Agents A1 and A2 (both available).

In the Case of UE M1, the UE M1 may have to strictly split the workload between itself (UE node) and Agent (in the server, such as Multi-access Edge Computing server or Cloud server) with strong restriction on local/regional regulations and with weak restriction or optional optimal choice of selecting the splitting point of the whole workload for machine-learning task of the related instance.

The task splitting point may be chosen to redistribute the workload between a device (for example, a wireless device such as a UE) and a server (for example, a cloud server or an edge cloud server that has superior computation power). Therefore, the device could manage the workload by using the task splitting point.

For example, the device could reduce the workload by asking the server to do more work when the communication cost is low. For example, the device may ask the server to do more work when there is no congestion. For example, the device may ask the server to do more work at certain time when data rate is low.

For other example, the device could increase the workload by reducing the amount of unprocessed data or raw data. For example, since the size of the unprocessed data or ra data is bigger than the size of the processed data, in machine learning operation, the device could increase the work load for generating more processed data.

Hereinafter, some embodiments of the present disclosure are described.

The advancement of robotics application technology would bring more business opportunity in telecommunication market segments through interdisciplinary and cross-industry collaborations. Some critical communication aspect of industrial robots in the context of cyber-physical control systems has been studied so that important use cases, including those with human-machine interface (HMI), can properly be supported with a higher level of communication availability, reliability, time synchronicity and so on. As a result, the related requirements have been identified in three typical traffic classes or communication patterns in industrial environments.

On the other hand, there may be a growing demand in consumer electronics segments that expects a great deal of roles that service-oriented robots (or service robots) should play in order to improve the level/quality of a human user's daily behaviours for, such as shopping, traveling and more to come upon us resulting from smart-living innovations. Some examples of service-oriented robots potentially include:

(1) serving robot that is designed to deliver food and beverage to residents of Continuing Care Retirement Community (CCRC), guests of hotels and visitors to airport lounges quickly and efficiently;
(2) porter robot that is designed to help minimize inconvenience for travelers by reducing slow service and long wait times. This robot can also facilitate express check-in and check-out service by handling payment and delivering luggage to a waiting vehicle in a fraction of the time;
(3) shopping cart robot that is designed to help customers get necessary information and get "hands free" while shopping The characteristics and required roles of service-oriented robots to play are, in general, different from those of industrial robots:

(1) Application: {assisting human} vs. {replacing human/worker's role}
(2) Target interacting points: {human users} vs. {(human) worker in job site operation}
(3) Target customers: {service-oriented retailers, (human) customers} vs. {manufacturing, enterprise}
(4) Technology readiness: {mature but need continuous evolution} vs. {relative more matured}

The service-oriented robots have both "independent roles" that they should play respectively and "cooperative roles" that a group of them should work and play together in coordination. Different from industrial robots or ordinary UEs (for example, handsets), a service-oriented robot as a UE motivated to work on in this Study will be considered to have particular features of communication support in order to play "cooperative roles" and "independent roles" specific to various use case scenarios. These service-oriented robots are typically capable of moving autonomously, continuing to assist the target customer in the relevant range of proximity. Upon automated recognition of user input/request (typically via HMI) or upon their decisions on particular actions to take independently or cooperatively, which is out of the scope of 3GPP, they can initiate, hold, terminate a communication per particular task and can perform autonomic and regulated communication with their cooperative partner robots.

A service-oriented robot can take multiple tasks from multiple customers, performing a task at a time or multiple tasks in parallel (for example, one in foreground and others in background wherever possible). Customers normally may not have to own the device/robot or hold the subscription of mobile communication services that the robot currently uses but instead, multiple customers share a robot at the service site such as in/at CCRC/restaurant/shopping mall. The study will also examine if the currently defined MuD/MUDE requirements are sufficient to support autonomic and regulated communication between service-oriented robots.

Figure 11:
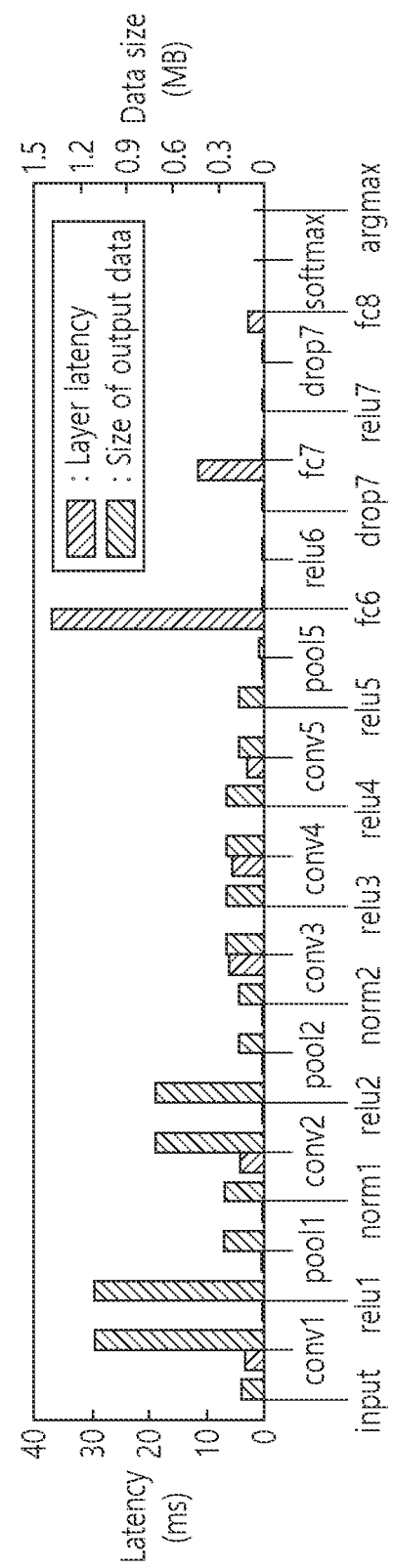
FIGS. 11, 12, and 13 show examples of Task Splitting between UE (handset/terminal) and Server to which implementations of the present disclosure is applied.
Figure 12:
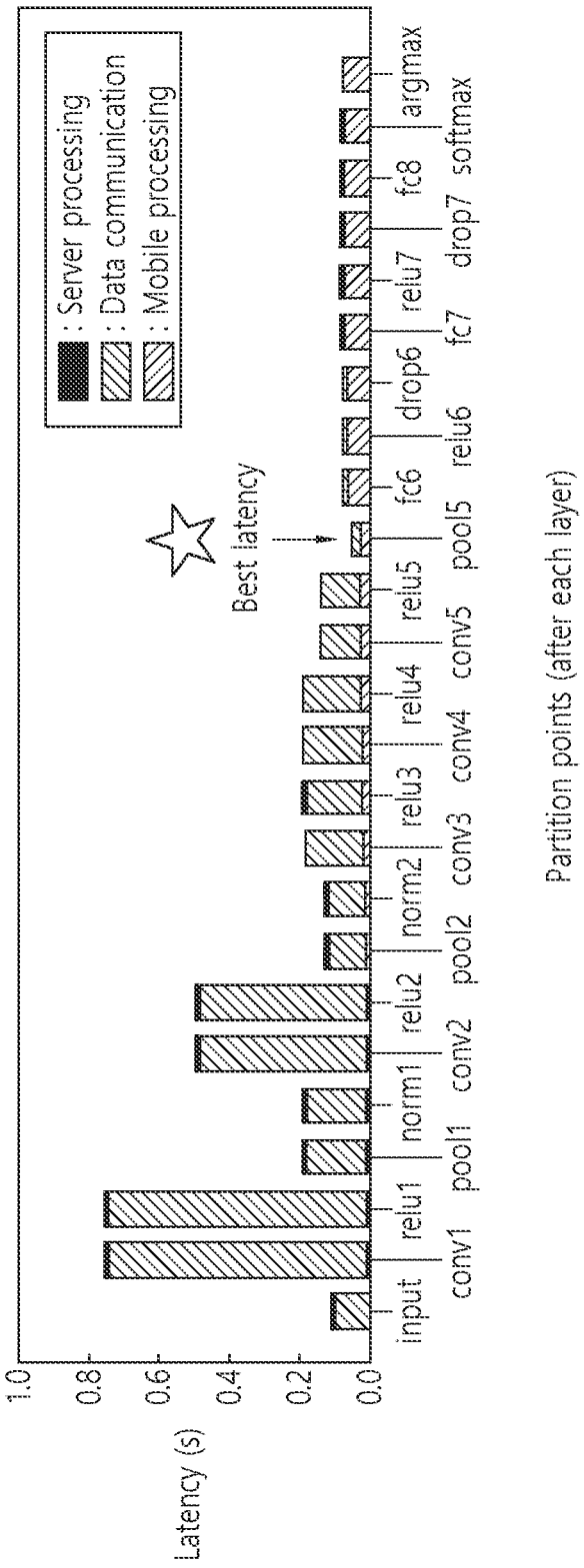
Figure 13:
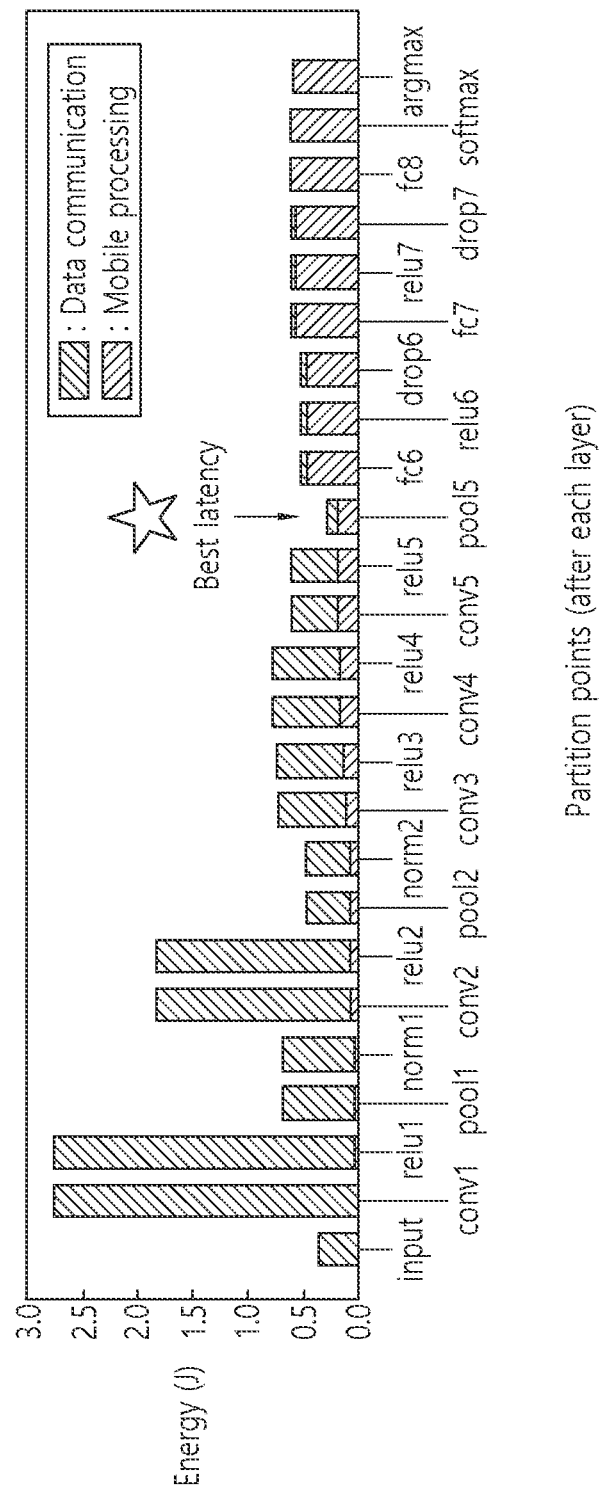

FIGS. 11, 12, and 13 show examples of Task Splitting between UE (handset/terminal) and Server to which implementations of the present disclosure is applied.

In particular, FIG. 11 may represent the per layer execution time (the left bar) and size of data (the right bar) after each layer's execution (input for next layer) in AlexNet. Data size sharply increases then decreases while computation generally increases through the network's execution.

In particular, FIGS. 12 and 13 may represent end-to-end latency and mobile energy consumption when choosing different partition points. After the execution of every layer is considered a partition point. Each bar represents the total latency as seen in FIG. 12 or mobile energy as seen in FIG. 13 if the DNN is partitioned after the layer marked on the X-axis. The left-most bar represents cloud-only processing and the right-most bar represents mobile-only processing. The partition points for best latency and mobile energy may be annotated.

Hereinafter, a method for updating data transfer disturbance in multi-agent multi-device ML operations, according to some embodiments of the present disclosure, will be described.

Figure 14:
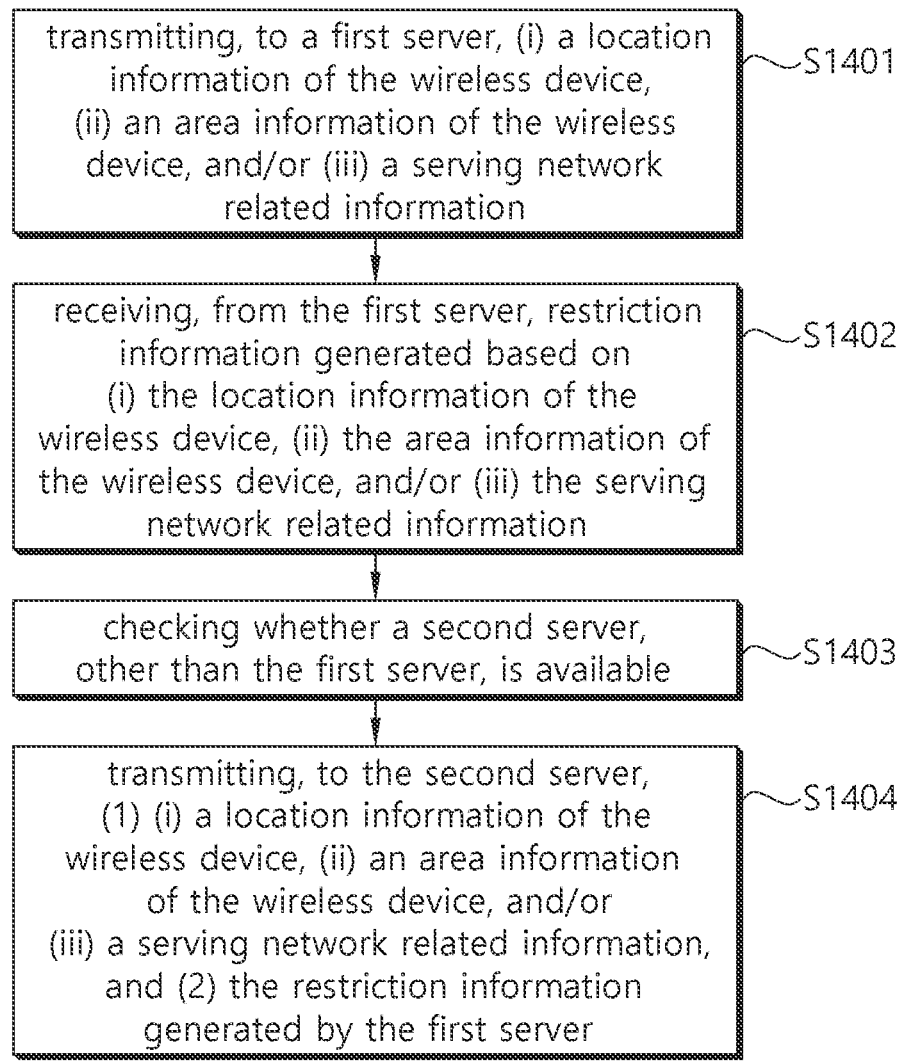
FIG. 14 shows an example of a method for updating data transfer disturbance in multi-agent multi-device ML operations.

FIG. 14 shows an example of a method for updating data transfer disturbance in multi-agent multi-device ML operations.

In particular, FIG. 14 shows an example of a method performed by a wireless device in a wireless communication system.

In step S1401, the wireless device may transmit, to a first server, (i) a location information of the wireless device, (ii) a residing area information of the wireless device, and/or (iii) a serving network related information.

For example, the location information of the wireless device may be geographical location information.

For example, the residing area information of the wireless device may include information of the area, for example, cell-level location information, where the device resides In step S1402, the wireless device may receive, from the first server, restriction information generated based on (i) the location information of the wireless device, (ii) the residing area information of the wireless device, and/or (iii) the serving network related information, such as serving network name.

For example, the restriction information may include a disturbance for data collection and/or data transmission based on privacy regulation, shortage of network resources, and/or temporary failure.

For example, the restriction information may include a regional regulation for privacy-related data collection and/or data transmission.

For example, the restriction information may include a restriction level generated by the first server, wherein the restriction level (i) informs users or UEs residing in a certain area, of a level of technical disturbance in data collection and/or data transfer such as traffic congestion level and/or (ii) informs users or UEs residing in a certain area, of a level of regional regulation that prevents those users or UEs residing in a certain area, from collecting and/or transferring privacy-related data even when there is no technical disturbance.

In step S1403, the wireless device may check whether a second server, other than the first server, is available.

According to some embodiments of the present disclosure, the wireless device may receive, from the first server, a list of alternative servers. The wireless device may check whether at least one server included in the list is available.

For example, the second server may be included in the list of the alternative servers.

In step S1404, based on that the second server is available, the wireless device may transmit, to the second server, (1)(i) a location information of the wireless device, (ii) a residing area information of the wireless device, and/or (iii) a serving network related information, and (2) the restriction information generated by the first server.

For example, based on that the second server is not available, the wireless device may determine at least one of task splitting points based on the restriction information generated by the first server.

For example, based on that the second server is not available, the wireless device may transmit, to the first server, information informing that the other server is not available.

According to some embodiments of the present disclosure, a wireless device may receive, from the second server, another restriction information generated by the second server.

The other restriction information is generated based on (1) (i) the location information of the wireless device, (ii) the residing area information of the wireless device, and/or (iii) the serving network related information, and (2) the restriction information generated by the second server.

The wireless device may check whether a third server, other than the first server and the second server, is available.

For example, based on that the third server is available, the wireless device may transmit, to the third server, (1) (i) a location information of the wireless device, (ii) a residing area information of the wireless device, and/or (iii) a serving network related information, and (2) the other restriction information generated by the second server.

According to some embodiments of the present disclosure, the wireless device may be in communication with at least one of a user equipment, a network, or an autonomous vehicle other than the wireless device.

Figure 15A:
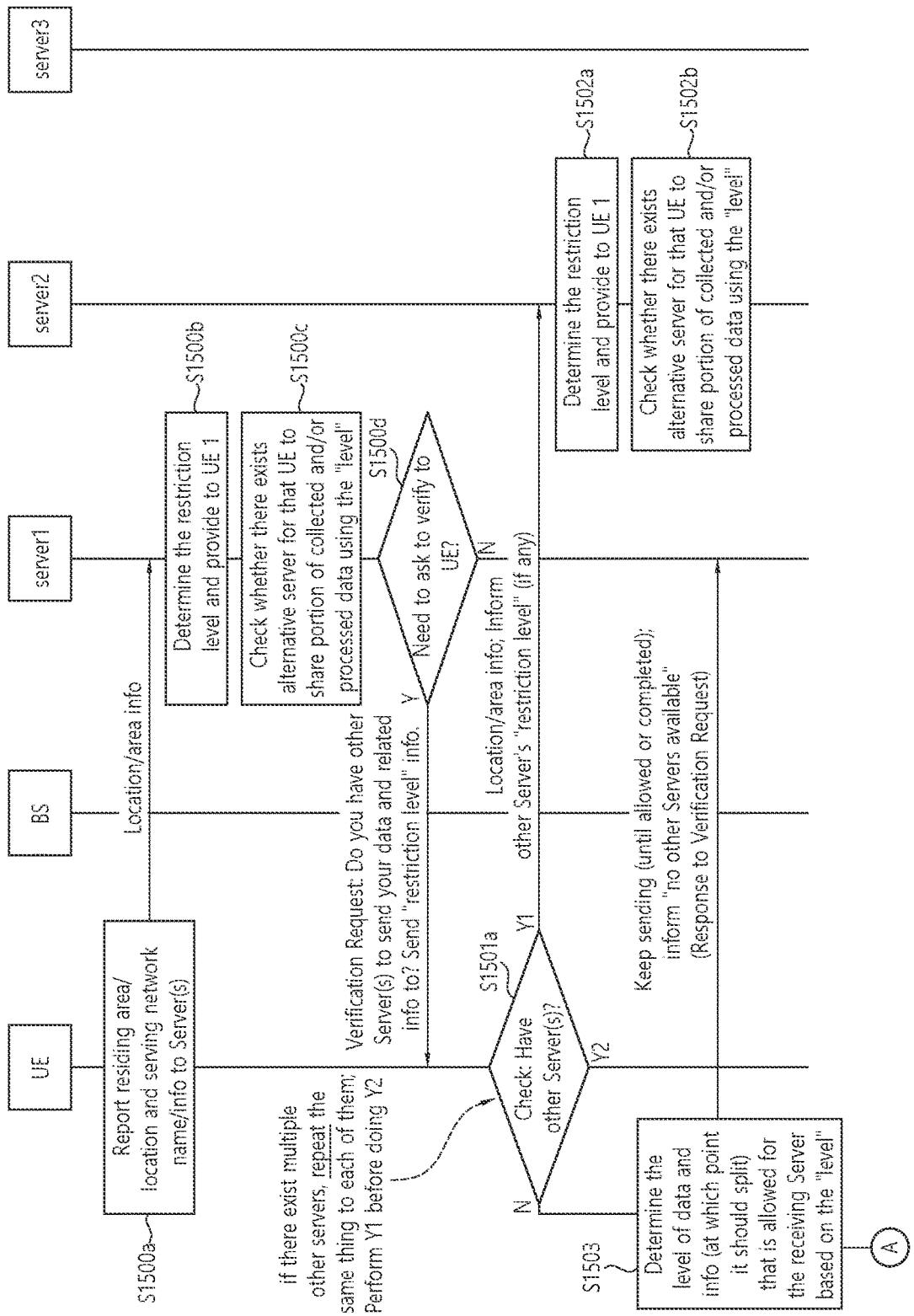

FIGS. 15A and 15B show an example of a method for updating data transfer disturbance in multi-agent multi-device ML operations.

In particular, FIGS. 15A and 15B show an example of a Task Split point indication between UE and servers (for example, Multi-access Edge Computing (MEC) server(s) and/or Cloud Server(s)). For example, UE may use NR or E-UTRA or WLAN (based on preference and availability). For example, UE may be connected to a serving network, for example, a base station (BS) (for example, eNB or gNB).

For example, UE may be a Robot that has communication capability as UE. For example, server1, server2, and server3 may be a MEC server, and/or a cloud server.

In step S1500a, UE may report (1) residing information informing area/location of the UE and (2) information including serving network name to a first server (server1).

In step S1500b, the server1 may determine the restriction level of the server1 for the UE. The server 1 may determine to provide the restriction level to the UE.

In step S1500c, the server1 may check whether there exists alternative server for the UE to share position of collected and/or processed data using the restriction level.

In step S1500d, based on determining to ask to the UE whether there exists the alternative server, the server1 may transmit, to the UE, a Verification Request. The Verification Request may inform that the UE needs to send information related to the restriction level for the UE, if the UE has other server(s) to send data of UE and/or related information.

In step S1501a, the UE may check whether the UE has other server(s) or not. Based on that the UE has other server, the UE may transmit, to the other server (for example, a second server (server2)), (1) information on location/area of the UE, and (2) information on the restriction level for the UE.

For example, if there exist multiple other servers, the UE may repeat to transmit, to multiple servers, (1) information on location/area of the UE, and (2) information on the restriction level of the server1 for the UE, before performing operations according to step S1501b below.

In step S1501b, based on that the UE has at least one of other server(s), the UE may transmit, to the server1, a response to the Verification Request received in step S1500d. The UE may transmit, to the server1, (1) information informing area/location of the UE and (2) information informing that the UE receives another Verification Request from another server (for example, server2).

For example, the UE may transmit the response to the Verification Request, after receiving the other Verification Request from the server2 in step S1502c, below.

In step S1502a, the server2 may determine the restriction level of the server2 for the UE. The server 2 may determine to provide the restriction level to the UE.

In step S1502b, the server2 may check whether there exists alternative server for the UE to share position of collected and/or processed data using the restriction level.

In step S1502c, based on determining to ask to the UE whether there exists the alternative server, the server1 may transmit, to the UE, a Verification Request. The Verification Request may inform that the UE needs to send information related to the restriction level of the server2 for the UE, if the UE has other server(s) to send data of UE and/or related information.

In step S1503, based on that the UE checks that the UE has no other server in step S1501a, the UE may determine the level of data and information (at which point it should split) that is allowed for the receiving server based on the restriction level. The UE may keep to transmit, to the server1, until allowed or completed, information informing that there is no other server available in response to the Verification Request received in step S1500d.

In step S1504, the UE may check whether the UE has other server(s). Based on that the UE has other server (for example, server3), the UE may transmit, to the server3, (1) information on location/area of the UE, and (2) information on the restriction level of other servers (for example, the restriction level of the server1 and/or the restriction level of the server2).

For example, the procedure from step S1504 may be similar to the procedure from/after step S1501a.

In step S1505, the UE may determine the level of data and information (at which point it should split) that is allowed for the receiving server based on the restriction level for the UE. The UE may transmit, to the server2, (1) information on location/area of the UE, and (2) information on the restriction level of other servers (for example, the restriction level of the server1 and/or the restriction level of the server3).

For example, if there is another server or other servers, the UE may repeat the above steps based on the allowed level.

Figure 16A:
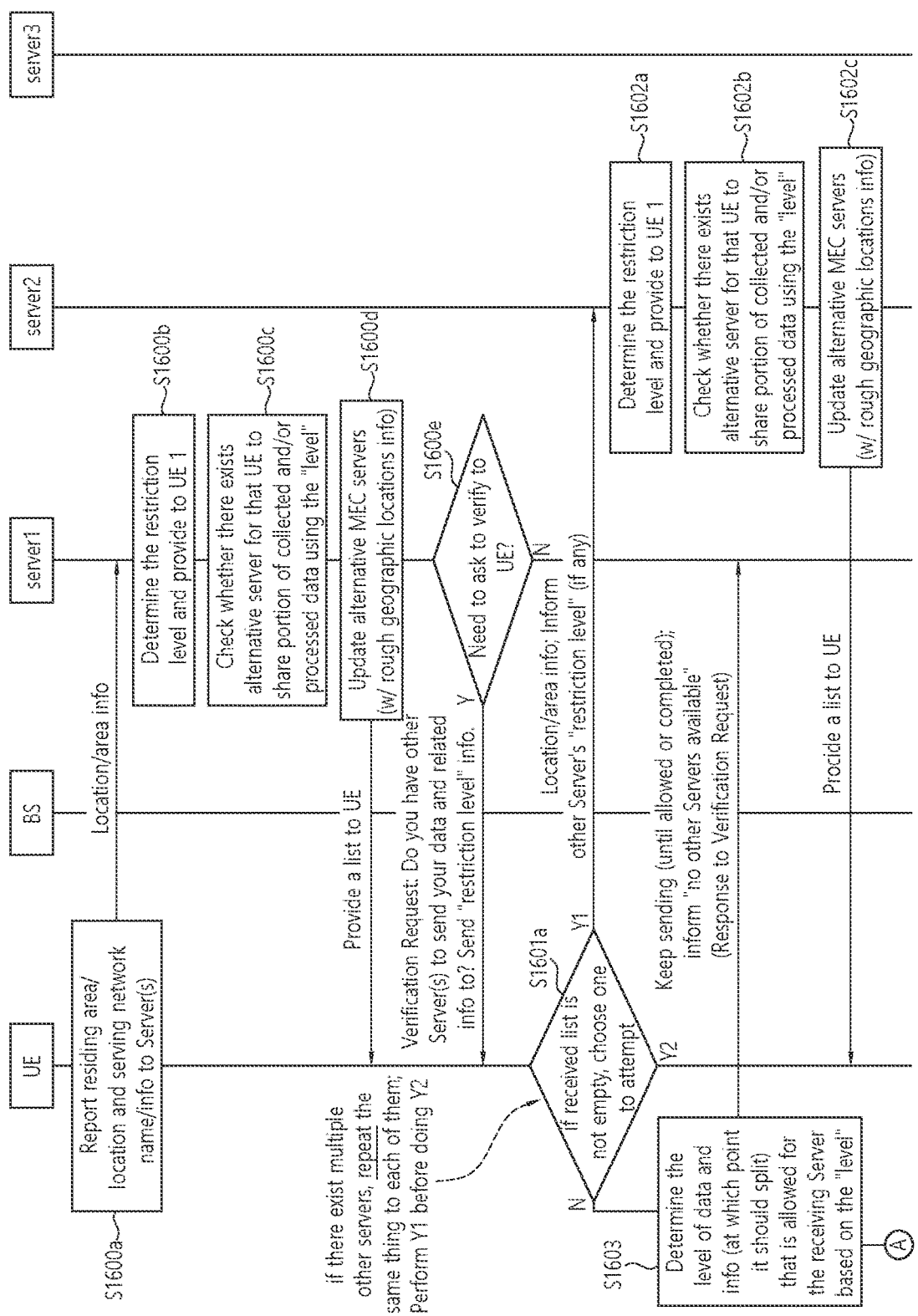
FIGS. 16A and 16B show an example of a method for updating data transfer disturbance in multi-agent multi-device ML operations.
Figure 16B:
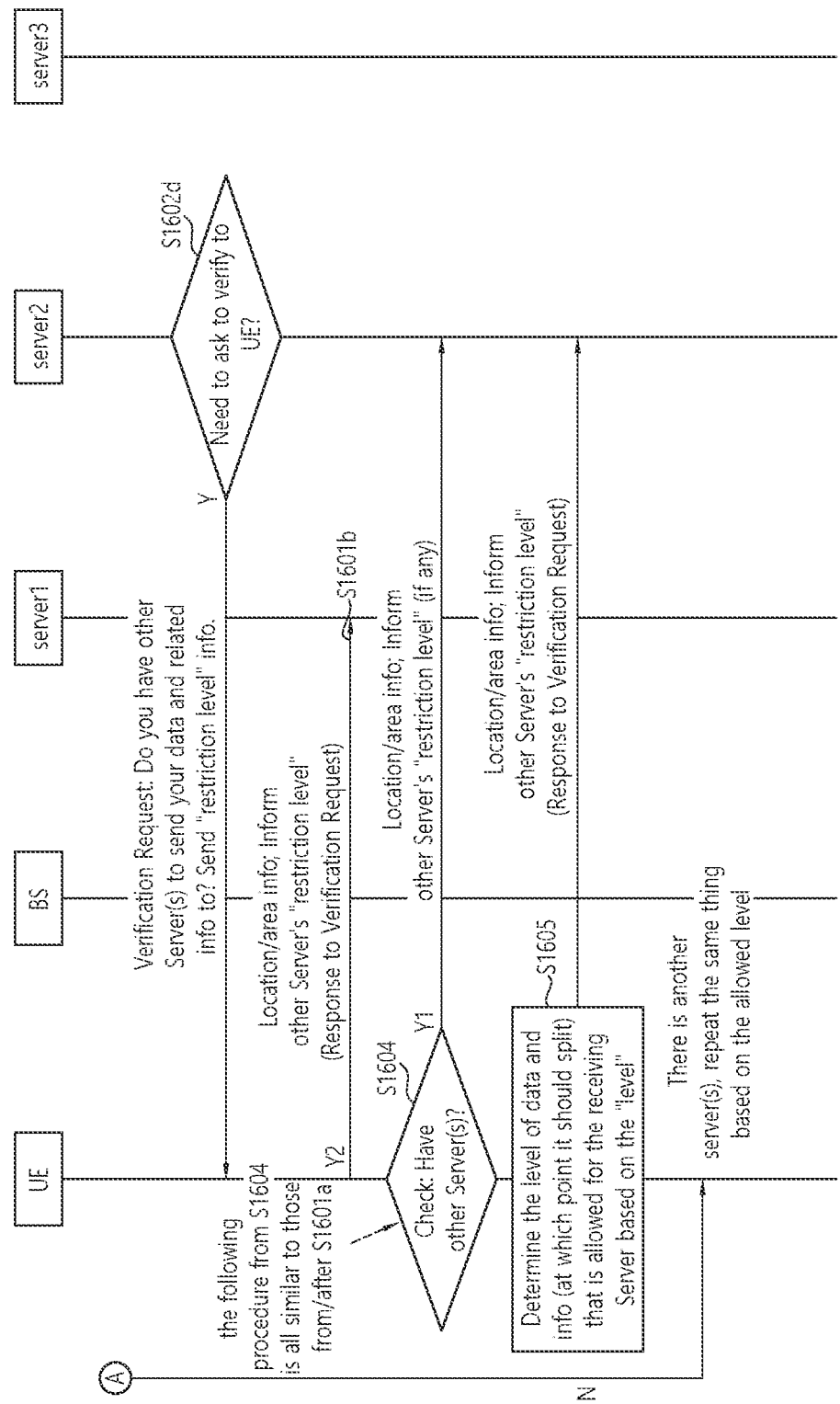

FIGS. 16A and 16B show an example of a method for updating data transfer disturbance in multi-agent multi-device ML operations.

According to some embodiments of the present disclosure, when a UE is geographically moving from one place to another place (for example, between two states, such as, from Nevada to California), or between countries), the UE may be able to know of a list of alternative agents to which the UE can attempt to switch in order to continue ongoing or necessary ML data (raw or trained data or a combination of them).

In particular, FIGS. 16A and 16B show an example of Task Split point indication method between UE and servers (for example, MEC server(s) and/or Cloud Server(s)). In FIGS. 16A and 16B, UE may establish connection servers for the data transfer. At least one of servers may transfer, to the UE, indication indicating a list of alternative Servers (for example, MCE servers, cloud servers, and/or learning agents).

When the initial connection for ML data transfer is established, the server (for example, a MEC server, a cloud server, and/or a learning agent) may indicate a list of alternative servers (for example, MCE servers, cloud servers, and/or learning agents) for the UE to use when restriction happens. The UE, that received the list, can utilize the information if some situation (for example, some restrictions) happens.

For example, when the UE receives the list, the UE may make its own ordered list out of the received list, based on its preference setting, its geographical location, and/or its experienced data (for example, learned data).

For example, when the server (for example, a MCE server) provides a list of other servers (for example, MCE servers, cloud servers, and/or learning agents), the server can also make a suggested order of other servers (for example, MCE servers, cloud servers, and/or learning agents) instead of providing an unordered list of them.

For example, when the server provides a suggested order of other servers in the list to the UE, the server may use an indicator (for example, one bit, or more). In this case, the UE can efficiently recognize the suggested order by the indication.

If the UE receives a suggested order of other servers, the UE may perform a comparison or verification for possible change of situations. The UE may finalize which ordered sequence of the other servers to use, when some restrictions happen.

Referring to FIG. 16, for example, UE may use NR or E-UTRA or WLAN (based on preference and availability). For example, UE may be connected to a serving network, for example, a base station (BS) (for example, eNB or gNB).

For example, UE may be a Robot. For example, server1, server2, and server3 may be a MEC server, and/or a cloud server.

In step S1600a, UE may report residing (1) information informing area/location of the UE and (2) information including serving network name to a first server (server1).

In step S1600b, the server1 may determine the restriction level of the server1 for the UE. The server 1 may determine to provide the restriction level to the UE.

In step S1600c, the server1 may check whether there exists alternative server for the UE to share position of collected and/or processed data using the restriction level.

In step S1600d, the server1 may update alternative servers (for example, MCE servers). For example, the server1 may update the alternative servers with information on rough geographic locations. The server1 may provide a list for the alternative servers to the UE.

In step S1600e, based on determining to ask to the UE whether there exists the alternative server, the server1 may transmit, to the UE, a Verification Request. The Verification Request may inform that the UE needs to send information related to the restriction level for the UE, if the UE has other server(s) to send data of UE and/or related information.

In step S1601a, if the received list is not empty, the UE may select one server included in the list and attempt the selected server. For example, the UE may check whether the UE has other server(s) or not. Based on that the UE has other server, the UE may transmit, to the other server (for example, a second server (server2)), (1) information on location/area of the UE, and (2) information on the restriction level for the UE.

For example, if there exist multiple other servers, the UE may repeat to transmit, to multiple servers, (1) information on location/area of the UE, and (2) information on the restriction level of the server1 for the UE, before performing operations according to step S1601b below.

In step S1601b, based on that the UE has at least one of other server(s), the UE may transmit, to the server1, a response to the Verification Request received in step S1600e. The UE may transmit, to the server1, (1) information informing area/location of the UE and (2) information informing that the UE receives another Verification Request from another server (for example, server2).

For example, the UE may transmit the response to the Verification Request, after receiving the other Verification Request from the server2 in step S1602d, below.

In step S1602a, the server2 may determine the restriction level of the server2 for the UE. The server 2 may determine to provide the restriction level to the UE.

In step S1602b, the server2 may check whether there exists alternative server for the UE to share position of collected and/or processed data using the restriction level.

In step S1602c, the server2 may update alternative servers (for example, MCE servers). For example, the server2 may update the alternative servers with information on rough geographic locations. The server2 may provide a list for the alternative servers to the UE.

In step S1602d, based on determining to ask to the UE whether there exists the alternative server, the server1 may transmit, to the UE, a Verification Request. The Verification Request may inform that the UE needs to send information related to the restriction level of the server2 for the UE, if the UE has other server(s) to send data of UE and/or related information.

In step S1603, based on that the UE checks that the UE has no other server in step S1601a, the UE may determine the level of data and information (at which point it should split) that is allowed for the receiving server based on the restriction level. The UE may keep to transmit, to the server1, until allowed or completed, information informing that there is no other server available in response to the Verification Request received in step S1600e.

In step S1604, the UE may check whether the UE has other server(s). Based on that the UE has other server (for example, server3), the UE may transmit, to the server3, (1) information on location/area of the UE, and (2) information on the restriction level of other servers (for example, the restriction level of the server1 and/or the restriction level of the server2).

For example, the procedure from step S1604 may be similar to the procedure from/after step S1601a.

In step S1605, the UE may determine the level of data and information (at which point it should split) that is allowed for the receiving server based on the restriction level for the UE. The UE may transmit, to the server2, (1) information on location/area of the UE, and (2) information on the restriction level of other servers (for example, the restriction level of the server1 and/or the restriction level of the server3).

For example, if there is another server or other servers, the UE may repeat the above steps based on the allowed level.

Hereinafter, an apparatus for updating data transfer disturbance in multi-agent multi-device ML operations, according to some embodiments of the present disclosure, will be described.

Hereinafter, an apparatus for updating data transfer disturbance in multi-agent multi-device ML operations, according to some embodiments of the present disclosure, will be described. Herein, the apparatus may be a wireless device (100 or 200) in FIGS. 2, 3, and 5.

For example, a wireless device may perform methods described in FIGS. 13, 15, and 16. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to transmit, to a first server. (i) a location information of the wireless device, (ii) a residing area information of the wireless device, and/or (iii) a serving network related information. The processor 102 may be configured to control the transceiver 106 to receive, from the first server, restriction information generated (i) the location information of the wireless device, (ii) the residing area information of the wireless device, and/or (iii) the serving network related information. The processor 102 may be configured to check whether a second server, other than the first server, is available. Based on that the second server is available, the processor 102 may be configured to control the transceiver 106 to transmit, to the second server, (1) (i) a location information of the wireless device, (ii) a residing area information of the wireless device, and/or (iii) a serving network related information, and (2) the restriction information generated by the first server.

According to some embodiments of the present disclosure, the processor 102 may be configured to control the transceiver 106 to receive, from the first server, a list of alternative servers. The processor 102 may be configured to check whether at least one server included in the list is available.

According to some embodiments of the present disclosure, the processor 102 may be configured to control the transceiver 106 to receive, from the second server, another restriction information generated by the second server. The other restriction information may be generated based on (1) (i) the location information of the wireless device, (ii) the residing area information of the wireless device, and/or (iii) the serving network related information, and (2) the restriction information generated by the second server.

In this case, the processor 102 may be configured to check whether a third server, other than the first server and the second server, is available.

Based on that the third server is available, the processor 102 may be configured to control the transceiver 106 to transmit, to the third server. (1) (i) a location information of the wireless device, (ii) a residing area information of the wireless device, and/or (iii) a serving network related information, and (2) the other restriction information generated by the second server.

According to some embodiments of the present disclosure, based on that the second server is not available, the processor 102 may be configured to determine at least one of task splitting points based on the restriction information generated by the first server.

According to some embodiments of the present disclosure, based on that the second server is not available, the processor 102 may be configured to control the transceiver 106 to transmit, to the first server, information informing that the other server is not available.

For example, the restriction information may include a disturbance for data collection and/or data transmission based on privacy regulation, shortage of network resources, and/or temporary failure.

For example, the restriction information may include a regional regulation for data collection and/or data transmission.

For example, the restriction information may include a restriction level generated by the first server. The restriction level may inform a level of disturbance in data collection and/or level of regional regulation.

For example, the location information of the wireless device may be geographical location information.

For example, the residing area information of the wireless device may include information of the area, for example, cell-level location information, where the device dwells According to some embodiments of the present disclosure, the processor 102 may be configured to be in communication with at least one of a user equipment, a network, or an autonomous vehicle other than the wireless device.

Hereinafter, a processor for a wireless device for updating data transfer disturbance in multi-agent multi-device ML operations, according to some embodiments of the present disclosure, will be described.

The processor may be configured to control the wireless device to transmit, to a first server, (i) a location information of the wireless device, (ii) a residing area information of the wireless device, and/or (iii) a serving network related information. The processor may be configured to control the wireless device to receive, from the first server, restriction information generated based on (i) the location information of the wireless device, (ii) the residing area information of the wireless device, and/or (iii) the serving network related information. The processor may be configured to control the wireless device to check whether a second server, other than the first server, is available. Based on that the second server is available, the processor may be configured to control the wireless device to transmit, to the second server, (1) (i) a location information of the wireless device. (ii) a residing area information of the wireless device, and/or (iii) a serving network related information, and (2) the restriction information generated by the first server.

According to some embodiments of the present disclosure, the processor may be configured to control the wireless device to receive, from the first server, a list of alternative servers. The processor may be configured to control the wireless device to check whether at least one server included in the list is available.

According to some embodiments of the present disclosure, the processor may be configured to control the wireless device to receive, from the second server, another restriction information generated by the second server. The other restriction information may be generated based on (1) (i) the location information of the wireless device, (ii) the residing area information of the wireless device, and/or (iii) the serving network related information, and (2) the restriction information generated by the second server.

In this case, the processor may be configured to control the wireless device to check whether a third server, other than the first server and the second server, is available.

Based on that the third server is available, the processor may be configured to control the wireless device to transmit, to the third server, (1) (i) a location information of the wireless device, (ii) a residing area information of the wireless device, and/or (iii) a serving network related information, and (2) the other restriction information generated by the second server.

According to some embodiments of the present disclosure, based on that the second server is not available, the processor may be configured to control the wireless device to determine at least one of task splitting points based on the restriction information generated by the first server.

According to some embodiments of the present disclosure, based on that the second server is not available, the processor may be configured to control the wireless device to transmit, to the first server, information informing that the other server is not available.

For example, the restriction information may include a disturbance for data collection and/or data transmission based on privacy regulation, shortage of network resources, and/or temporary failure.

For example, the restriction information may include a regional regulation for data collection and/or data transmission.

For example, the restriction information may include a restriction level generated by the first server. The restriction level may inform a level of disturbance in data collection and/or level of regional regulation.

For example, the location information of the wireless device may be geographical location information.

For example, the residing area information of the wireless device may include information of the area, for example, cell-level location information, where the device dwells According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for autonomous changing for updating data transfer disturbance in multi-agent multi-device ML operations, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to transmit, to a first server, (i) a location information of the wireless device, (ii) a residing area information of the wireless device, and/or (iii) a serving network related information. The stored a plurality of instructions may cause the wireless device to receive, from the first server, restriction information generated based on (i) the location information of the wireless device, (ii) the residing area information of the wireless device, and/or (iii) the serving network related information. The stored a plurality of instructions may cause the wireless device to check whether a second server, other than the first server, is available. Based on that the second server is available, the stored a plurality of instructions may cause the wireless device to transmit, to the second server, (1) (i) a location information of the wireless device, (ii) a residing area information of the wireless device, and/or (iii) a serving network related information, and (2) the restriction information generated by the first server.

According to some embodiments of the present disclosure, the stored a plurality of instructions may cause the wireless device to receive, from the first server, a list of alternative servers. The stored a plurality of instructions may cause the wireless device to check whether at least one server included in the list is available.

According to some embodiments of the present disclosure, the stored a plurality of instructions may cause the wireless device to receive, from the second server, another restriction information generated by the second server. The other restriction information may be generated based on (1) (i) the location information of the wireless device, (ii) the residing area information of the wireless device, and/or (iii) the serving network related information, and (2) the restriction information generated by the second server.

In this case, the stored a plurality of instructions may cause the wireless device to check whether a third server, other than the first server and the second server, is available.

Based on that the third server is available, the stored a plurality of instructions may cause the wireless device to transmit, to the third server. (1) (i) a location information of the wireless device, (ii) a residing area information of the wireless device, and/or (iii) a serving network related information, and (2) the other restriction information generated by the second server.

According to some embodiments of the present disclosure, based on that the second server is not available, the stored a plurality of instructions may cause the wireless device to determine at least one of task splitting points based on the restriction information generated by the first server.

According to some embodiments of the present disclosure, based on that the second server is not available, the stored a plurality of instructions may cause the wireless device to transmit, to the first server, information informing that the other server is not available.

For example, the restriction information may include a disturbance for data collection and/or data transmission based on privacy regulation, shortage of network resources, and/or temporary failure.

For example, the restriction information may include a regional regulation for data collection and/or data transmission.

For example, the restriction information may include a restriction level generated by the first server. The restriction level may inform a level of disturbance in data collection and/or level of regional regulation.

For example, the location information of the wireless device may be geographical location information.

For example, the residing area information of the wireless device may include information of the area, for example, cell-level location information, where the device resides.

According to some embodiments of the present disclosure, the stored a plurality of instructions may cause the wireless device to be in communication with at least one of a user equipment, a network, or an autonomous vehicle other than the wireless device.

According to some embodiments of the present disclosure, the stored a plurality of instructions may cause the wireless device to be in communication with at least one of a user equipment, a network, or an autonomous vehicle other than the wireless device.

The present disclosure may have various advantageous effects.

According to some embodiments of the present disclosure, a wireless device could perform mass data transmission efficiently.

For example, a wireless device could perform the mass data transmission by minimizing disturbance caused by technical factors or (zone-based) regulatory factors.

For example, a wireless device could perform the mass data transmission by bypassing and/or preparing disturbance caused by technical factors or (zone-based) regulatory factors.

According to some embodiments of the present disclosure, a wireless communication system could provide an efficient solution for mass data collection.

For example, a wireless communication system could perform the mass data collection by preparing, bypassing, and minimizing disturbance by technical factors or (zone-based) regulatory factors.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
transmitting, by a wireless device to a first network node, a first message including (i) location information related to a specific area where the wireless device being located and (ii) information related to the first network node;
receiving, by the wireless device from the first network node, information related to a first restriction level related to the first network node,
wherein the information related to the first restriction level includes an amount of traffic for the first network node from wireless devices in the specific area;
receiving, by the wireless device from the first network node, a list of alternative network nodes;
receiving, by the wireless device from the first network node, a verification request for another network node connected to the wireless device;
checking, by the wireless device, whether a second network node among the list of the alternative network nodes is available;
based on that the second network node is available, transmitting, by the wireless device to the second network node, a second message including (i) location information related to the specific area where the wireless device being located, (ii) information related to the second network node, and (iii) information related to the first restriction level related to the first network node;

receiving, by the wireless device from the second network node, information related to a second restriction level, wherein the information related to the second restriction level includes an amount of traffic for the second network node from wireless devices in the specific area; and transmitting, by the wireless device to the first network node, a third message including the information related to the second restriction level, wherein the method further comprises, based on that the second network node is not available, determining, by the wireless device, at least one of task splitting points based on the information related to the first restriction level.

2. The method of claim 1, wherein the method further comprises, checking, by the wireless device, whether a third network node, other than the first network node and the second network node, is available.

3. The method of claim 2, wherein the method further comprises, based on that the third network node is available, transmitting, by the wireless device to the third network node, a fourth message including (i) location information related to a specific area where the wireless device being located, (ii) information related to the third network node, (iii) the information related to the first restriction level related to the first network node, and (iv) the information related to the second restriction level.

4. The method of claim 1, wherein the method further comprises, based on that the second network node is not available, transmitting, by the wireless device to the first network node, information informing that the second network node is not available.

5. The method of claim 1, wherein the information related to the first restriction level related to the first network node and the information related to the second restriction level related to the second network node includes information related to a disturbance for data collection and/or data transmission based on privacy regulation, shortage of network resources, and/or temporary failure.

6. The method of claim 1, wherein the information related to the first restriction level related to the first network node and the information related to the second restriction level related to the second network node includes information related to a regional regulation for privacy-related data collection and/or data transmission.

7. The method of claim 1, wherein the wireless device is in communication with at least one of a user equipment, a network, or an autonomous vehicle other than the wireless device.

8. A wireless device, comprising:
a transceiver;
a memory; and
at least one processor operatively coupled to the transceiver and the memory, and adapted to perform operations, the operations comprising:
transmitting, to a first network node, a first message including (i) location information related to a specific area where the wireless device being located and (ii) information related to the first network node;

receiving, from the first network node, information related to a first restriction level related to the first network node, wherein the information related to the first restriction level includes an amount of traffic for the first network node from wireless devices in the specific area;

receiving, from the first network node, a list of alternative network nodes;

receiving, from the first network node, a verification request for another network node connected to the wireless device;

checking whether a second network node among the list of the alternative network nodes is available;

based on that the second network node is available, transmitting, to the second network node, a second message including (i) location information related to the specific area where the wireless device being located, (ii) information related to the second network node, and (iii) information related to the first restriction level related to the first network node;

receiving, by the wireless device from the second network node, information related to a second restriction level, wherein the information related to the second restriction level includes an amount of traffic for the second network node from wireless devices in the specific area; and transmitting, by the wireless device to the first network node, a third message including the information related to the second restriction level, wherein the operations further comprise, based on that the second network node is not available, determining, by the wireless device, at least one of task splitting points based on the information related to the first restriction level.

9. The wireless device of claim 8, wherein the operations further comprising:

checking whether a third network node, other than the first network node and the second network node, is available.

10. The wireless device of claim 9, the operations further comprising: based on that the third network node is available, transmitting, to the third network node, a fourth message including (i) location information related to a specific area where the wireless device being located, (ii) information related to the third network node, (iii) the information related to the first restriction level related to the first network node, and (iv) the information related to the second restriction level.

11. A non-transitory computer-readable medium having stored thereon a plurality of instructions, which, when executed by a processor of a wireless device, cause the wireless device to perform operations, the operations comprising:

transmitting, to a first network node, a first message including (i) location information related to a specific area where the wireless device being located and (ii) information related to the first network node;

receiving, from the first network node, information related to a first restriction level related to the first network node, wherein the information related to the first restriction level includes an amount of traffic for the first network node from wireless devices in the specific area;

receiving, from the first network node, a list of alternative network nodes;

receiving, from the first network node, a verification request for another network node connected to the wireless device;
checking whether a second network node among the list of the alternative network nodes is available;
based on that the second network node is available, transmitting, to the second network node, a second message including (i) location information related to the specific area where the wireless device being located, (ii) information related to the second network node, and (iii) information related to the first restriction level related to the first network node;
receiving, by the wireless device from the second network node, information related to a second restriction level,
wherein the information related to the second restriction level includes an amount of traffic for the second network node from wireless devices in the specific area; and
transmitting, by the wireless device to the first network node, a third message including the information related to the second restriction level,
wherein the operations further comprise,
based on that the second network node is not available, determining, by the wireless device, at least one of task splitting points based on the information related to the first restriction level.

* * * * *